Feb. 9, 1971   P. J. JENKINS   3,562,080
PALLET FOR SUPPORTING HEAVY OR BULKY OBJECTS
Filed Nov. 13, 1967   2 Sheets-Sheet 1

Inventor
Peter J. Jenkins
By Stevens, Davis, Miller & Mosher
Attorneys

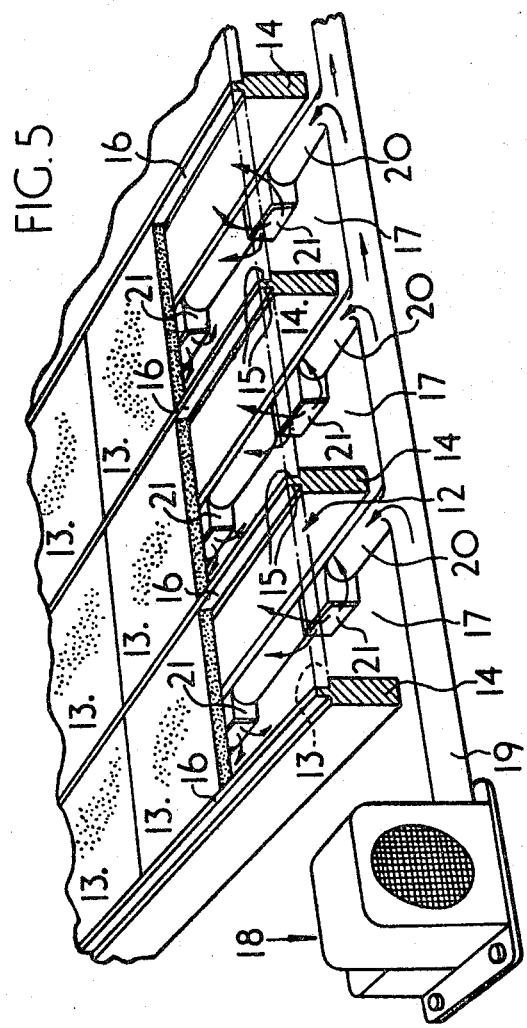

United States Patent Office 3,562,080
Patented Feb. 9, 1971

3,562,080
PALLET FOR SUPPORTING HEAVY OR
BULKY OBJECTS
Peter J. Jenkins, Sandbach, England, assignor to The Dunlop Company Limited, London, England, a British company
Filed Nov. 13, 1967, Ser. No. 682,030
Claims priority, application Great Britain, Nov. 22, 1966, 52,204/66
Int. Cl. B32b 5/12
U.S. Cl. 161—57                            1 Claim

ABSTRACT OF THE DISCLOSURE

A pallet for supporting heavy or bulky objects such as packing cases during transit for example from place to place in warehouses, in the form of a flexible rubber or plastic material having embedded therein two separate cord layers each of individually flexible high modulus parallel cords, and a textile reinforcement or cord rubber or plastic layer sandwiched between the cord layers, the cords of one cord layer being parallel with the cords of the other cord layer and the separation of the cord layers being sufficient to give the pallet a degree of transverse rigidity.

---

This invention relates to pallets of the kind used for supporting packing cases or other heavy or bulky objects in transit, for example in moving such articles from place to place in warehouses, and constitutes an improvement in or modification of the invention claimed in our U.K. Pat. No. 974,131.

U.K. Pat. No. 974,131 describes and claims conveyor belting comprising a flexible plastic material having embedded therein a composite reinforcement comprising a textile reinforcement, together with at least two layers of individually flexible metal cords, the metal cords in each layer lying substantially parallel with each other and substantially at right angles to the length of the belting, the separation of the metal-cord layers being sufficient to confer a substantial degree of transverse rigidity upon the belting as a whole, and a textile constituent of the composite reinforcement being disposed between each metal-cord layer and the adjoining metal-cord layer.

It has now been discovered that a reinforced rubber or plastic structure having similar properties to those of the belting claimed in U.K. Pat. No. 974,131 can be advantageously employed as a pallet.

According to the present invention, a pallet comprises a flexible rubber or plastic material having embedded therein a composite reinforcement comprising a textile reinforcement or hard rubber or plastic layer sandwiched between two layers of individually flexible high-modulus cords, the high-modulus cords in each of the said layers lying substantially parallel with one another and parallel with the cords in the other layer and the separation of the high-modulus cord layers being sufficient to confer a substantial degree of transverse rigidity upon the pallet.

The term "high-modulus cord" as used in the preceding paragraph means cord of steel, glass fibre or other material having a Young's modulus which is very much greater than materials such as nylon, rayon or natural textile materials.

Embodiments of the invention will now be described, by way of example with reference to the accompanying drawings in which:

FIG. 5 is a diagrammatic perspective sectional view of part of an air floatation system in which pallets according to the invention may be used.

Each of the embodiments to be described constitutes a pallet for use in a warehouse having a perforated floor through which jets of air are blown to support the pallet and any load carried thereon, thus reducing friction to enable the load to be moved easily from place to place.

Figure 2:
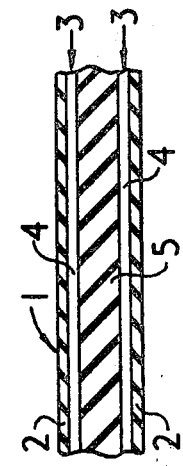
FIG. 2 shows a section taken on the line II—II in FIG. 1.
Figure 1:
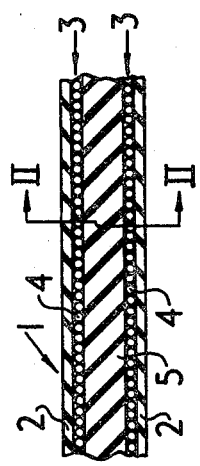
FIG. 1 shows a section through a pallet according to the invention in a plane at right angles to the plane of the pallet, the pallet having two layers of cords.

In the first embodiment, shown in FIGS. 1 and 2, a pallet 1 consists of a square board formed from reinforced rubber material, approximately 4 feet square and ¾ of an inch in thickness. The outer layers 2 forming the upper and lower surfaces of the pallet are of a high grade rubber compound to resist abrasion, and the pallet is reinforced by two layers 3 of rubberised parallel steel cords 4 separated from one another by a layer 5 of high modulus rubber compound.

The above construction will be semirigid along the direction of the reinforcing cords 4 and very flexible at 90° to these cords.

Figure 4:
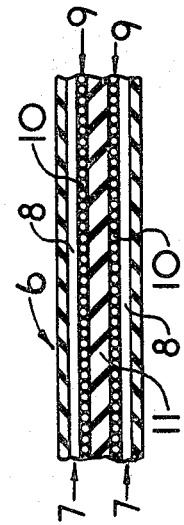
FIG. 4 shows a section taken on the line IV—IV in FIG. 3.
Figure 3:
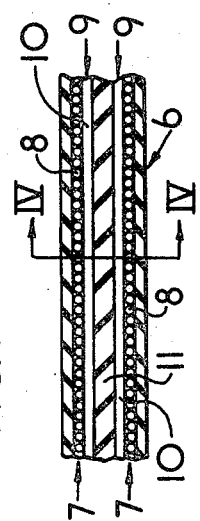
FIG. 3 shows a section through a pallet according to the invention in a plane at right angles to the plane of the pallet, the pallet having four layers of cords.

In the second embodiment shown in FIGS. 3 and 4, a pallet 6 of similar general construction to that described above is provided with two additional layers 7 of rubberised parallel steel cords 8 placed one above and one below a reinforcement comprising two layers 9 of rubberised parallel steel cords 10 separated from one another by a layer 11 of high modulus rubber compound, the reinforcement being similar to the reinforcement 3, 4, 5 described in connection with the first embodiment. The cords 8 of the additional or outer layers 7 are disposed at 90° to the cords 10 of the adjacent inner layers 9.

The pallet 6 described in the preceding paragraph will be highly resistant to bending in both directions, but will retain sufficient flexibility to render it less liable to damage than, for example, a wooden pallet.

The pallets described above have an important advantage when used with an air floatation system in that they are unlikely to be damaged in use, and will therefore always have a smooth flat lower surface which is well-adapted to cooperate with the air jets to provide adequate support for the load carried.

An example of an air floatation system as referred to above will now be described.

As shown in FIG. 5 of the drawings an air floatation system in which pallets according to the invention may be used comprises an air-pervious load-supporting member 12 forming the floor of a warehouse over which pallets as previously described together with their loads are to be moved, and means for causing a difference in the air pressure between opposite surfaces of the load-supporting member whereby may be caused a flow of air through the load-supporting member, so that an upthrust is exerted on a pallet when positioned on the load-supporting member.

The load-supporting member is in the form of an assembly of tiles 13, each tile being of a porous material comprising particles in the form of ballotini or particles of silica, held together by an epoxy resin bonding agent.

The tiles 13 are generally square in shape, arranged in parallel rows, and supported by an assembly of joists 14. Each joist is positioned underneath the adjacent side edges 15 between two successive rows of tiles, and extends along the length of the two rows providing support for one edge of each tile in the two rows.

A joist 14 is provided for the adjacent side edges 15 of each pair of successive rows of tiles, and each joist is formed with a narrow rib 16 extending along the length of the joist and separating the edges of the successive rows of tiles. An airtight joint between each side edge 15 of each row of tiles and the corresponding confronting side edge of its respective rib 16 is ensured by inserting a sealing compound or gasket (not shown) between these confronting side edges.

Each row of tiles 13 together with the two respective joists 14 and a surface 17 on which the joists rest constitutes a pressure chamber, the ends (not shown) of which are closed.

An air blower 18 is provided to supply a steady flow of air into each pressure chamber, the flow of air being led to the pressure chambers by a transverse air duct 19 carrying spaced longitudinal ducts 20, one for each pressure chamber. Each longitudinal duct 20 carries outlets 21 at spaced apart positions along the length of the respective pressure chamber through which the air flow enters the chamber.

The structure described above thus constitutes means for causing a difference in the air pressure between the opposite surfaces of the load-supporting member 12. The air pressure rises in the pressure chambers as soon as the air blower commences operation and a flow of air is established through the porous material of the tiles 13.

When a pallet is positioned on the load-supporting member 12 while the air blower is operating, the air flowing through the tiles immediately beneath the pallet exerts an upthrust on the underside of the pallet and spills out round the edges of the pallet with the result that frictional forces resisting sliding movement of the pallet over the load-supporting member are considerably reduced, and the pallet together with a load placed thereon can be easily pushed across the load-supporting member 12.

In an alternative air floatation system otherwise similar to that described above the tiles 13 are formed from a material impervious to air and have a plurality of perforations formed therethrough.

Having now described my invention—what I claim is:
1. A pallet comprising a boardlike member of flexible polymeric material, having reinforcement therein to provide a substantial degree of transverse rigidity in all directions, said reinforcement comprising:
  (a) a first layer of individually flexible high modulus cords embedded in the elastomeric material, the cords extending parallel to each other;
  (b) a second layer of individually flexible high modulus cords embedded in the elastomeric material adjacent to said first layer and parallel thereto, the cords in the second layer extending parallel to each other and substantially normal to the direction of the cords of the first layer;
  (c) a third layer of individually flexible high modulus cords embedded in the elastomeric material, the cords in the third layer extending parallel to each other, the third layer extending parallel to said second layer and spaced from said second layer;
  (d) a fourth layer of individually flexible high modulus cords embedded in the elastomeric material, adjacent to said third layer, and parallel thereto, the cords in the fourth layer extending parallel to each other and substantially normal to the direction of the cords in said third layer, the cords of one of said third and fourth layers extending in the same direction as the cords in the first layer.

References Cited
UNITED STATES PATENTS

| | | | |
|---|---|---|---|
| 2,858,988 | 11/1958 | Luther | 161—58X |
| 3,144,930 | 8/1964 | Michels | 198—193 |
| 3,297,513 | 1/1967 | Robinson | 161—57 |
| 3,298,417 | 1/1967 | Keefe | 161—60X |

WILLIAM A. POWELL, Primary Examiner

U.S. Cl. X.R.

161—140, 168; 214—1